US008751442B2

(12) United States Patent
Ozzie et al.

(10) Patent No.: US 8,751,442 B2
(45) Date of Patent: Jun. 10, 2014

(54) SYNCHRONIZATION ASSOCIATED DUPLICATE DATA RESOLUTION

(75) Inventors: Raymond E. Ozzie, Seattle, WA (US);
Jack E. Ozzie, North Bend, WA (US);
Paresh S. Suthar, Redmond, WA (US);
Raman Narayanan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 495 days.

(21) Appl. No.: 11/674,054

(22) Filed: Feb. 12, 2007

(65) Prior Publication Data

US 2008/0195739 A1 Aug. 14, 2008

(51) Int. Cl.
*G06F 7/00* (2006.01)
*G06F 17/00* (2006.01)

(52) U.S. Cl.
USPC ........................................... 707/610

(58) Field of Classification Search
USPC ........................................... 707/610
See application file for complete search history.

(56) References Cited

U.S. PATENT DOCUMENTS

| | | | |
|---|---|---|---|
| 5,261,080 A | 11/1993 | Khoyi et al. | |
| 5,392,386 A | 2/1995 | Chalas | |
| 5,442,742 A | 8/1995 | Greyson et al. | |
| 5,579,521 A | 11/1996 | Shearer et al. | |
| 5,625,809 A | 4/1997 | Dysart et al. | |
| 5,752,254 A | 5/1998 | Sakairi | |
| 5,781,192 A | 7/1998 | Kodimer | |
| 5,781,908 A | 7/1998 | Williams et al. | |
| 5,899,996 A | 5/1999 | Dysart et al. | |
| 5,924,099 A | 7/1999 | Guzak et al. | |
| 5,926,633 A | 7/1999 | Takagi et al. | |
| 5,964,834 A | 10/1999 | Crutcher | |
| 5,974,238 A | 10/1999 | Chase, Jr. | |
| 6,091,731 A | 7/2000 | Biegaj et al. | |
| 6,202,100 B1 | 3/2001 | Maltby et al. | |
| 6,295,541 B1 | 9/2001 | Bodnar et al. | |
| 6,309,305 B1 | 10/2001 | Kraft | |
| 6,338,084 B1 | 1/2002 | Rankin et al. | |
| 6,401,104 B1 * | 6/2002 | LaRue et al. ........................ | 1/1 |
| 6,460,089 B1 | 10/2002 | Romano et al. | |
| 6,490,634 B2 | 12/2002 | Coiner | |
| 6,532,474 B2 | 3/2003 | Iwamoto et al. | |
| 6,549,922 B1 | 4/2003 | Srivastava et al. | |

(Continued)

FOREIGN PATENT DOCUMENTS

| | | |
|---|---|---|
| EP | 0597575 | 12/1999 |
| WO | WO0073902 | 12/2000 |
| WO | WO03030475 | 4/2003 |

OTHER PUBLICATIONS

Kim, Rimey , "Version Headers for Flexible Synchronization and Conflict Resolution," Dated Nov. 22, 2004, pp. 1-14.

(Continued)

*Primary Examiner* — Robert Beausoliel, Jr.
*Assistant Examiner* — Michael Pham
(74) *Attorney, Agent, or Firm* — Micah Goldsmith; Jim Ross; Micky Minhas

(57) ABSTRACT

Systems, methods, and data structures associated with the detection and resolution of duplicate data that might result when using multiple synchronization protocols are described. These techniques may use different types of identification data associated with data that is synchronized, as well as a defined set of operations that may be performed by one or more endpoints to identify and remove duplicated data.

20 Claims, 3 Drawing Sheets

(56) References Cited

U.S. PATENT DOCUMENTS

| | | |
|---|---|---|
| 6,553,037 B1 | 4/2003 | Pivowar et al. |
| 6,591,295 B1 | 7/2003 | Diamond et al. |
| 6,675,213 B1 | 1/2004 | Schmonsees |
| 6,721,951 B1 | 4/2004 | Williams et al. |
| 6,724,403 B1 | 4/2004 | Santoro et al. |
| 6,760,728 B1 | 7/2004 | Osborn |
| 6,781,192 B2 | 8/2004 | Farrar |
| 6,912,690 B2 | 6/2005 | Bauchot |
| 6,983,328 B2 | 1/2006 | Beged-Dov et al. |
| 6,986,105 B2 | 1/2006 | Walker, Jr. |
| 6,993,522 B2 | 1/2006 | Chen et al. |
| 7,003,546 B1 | 2/2006 | Cheah |
| 7,007,041 B2 | 2/2006 | Multer |
| 7,013,316 B1 | 3/2006 | Hansen et al. |
| 7,130,924 B2 | 10/2006 | Bartlett et al. |
| 7,146,571 B2 | 12/2006 | Bates et al. |
| 7,207,008 B1 | 4/2007 | Koch |
| 7,260,610 B2 | 8/2007 | Grooters |
| 7,293,112 B2 | 11/2007 | Cone et al. |
| 7,395,317 B2 | 7/2008 | Naick et al. |
| 7,421,155 B2 | 9/2008 | King et al. |
| 7,475,390 B2 | 1/2009 | Berstis et al. |
| 7,480,861 B2 | 1/2009 | Yalovsky et al. |
| 7,496,230 B2 | 2/2009 | Chen et al. |
| 7,640,184 B1 | 12/2009 | Lunt |
| 7,725,456 B2 | 5/2010 | Augustine |
| 7,774,753 B1 | 8/2010 | Reilly et al. |
| 7,933,296 B2 | 4/2011 | Augustine et al. |
| 7,950,066 B1 | 5/2011 | Zuili |
| 8,001,081 B1 | 8/2011 | Mills et al. |
| 8,020,112 B2 | 9/2011 | Ozzie |
| 8,296,671 B2 | 10/2012 | Narayanan et al. |
| 8,370,423 B2 | 2/2013 | Ozzie et al. |
| 2002/0007380 A1 | 1/2002 | Bauchot et al. |
| 2002/0073204 A1 | 6/2002 | Dutta et al. |
| 2002/0122054 A1 | 9/2002 | Hind et al. |
| 2002/0133508 A1 | 9/2002 | LaRue et al. |
| 2002/0138653 A1 | 9/2002 | Ogura |
| 2002/0143997 A1 | 10/2002 | Huang et al. |
| 2003/0009602 A1 | 1/2003 | Jacobs et al. |
| 2003/0105831 A1 | 6/2003 | O'Kane |
| 2003/0115301 A1* | 6/2003 | Koskimies .................... 709/221 |
| 2003/0142134 A1 | 7/2003 | Bates et al. |
| 2003/0149708 A1 | 8/2003 | Tsao et al. |
| 2003/0220966 A1 | 11/2003 | Hepper |
| 2004/0019614 A1* | 1/2004 | Wang .......................... 707/202 |
| 2004/0100496 A1 | 5/2004 | Creasor et al. |
| 2004/0103167 A1 | 5/2004 | Grooters et al. |
| 2004/0122809 A1 | 6/2004 | Clark et al. |
| 2004/0148375 A1 | 7/2004 | Levett et al. |
| 2004/0153974 A1 | 8/2004 | Walker |
| 2004/0172423 A1 | 9/2004 | Kaasten et al. |
| 2004/0172584 A1 | 9/2004 | Jones et al. |
| 2004/0205470 A1 | 10/2004 | Jones et al. |
| 2004/0210845 A1 | 10/2004 | Paul et al. |
| 2004/0210846 A1 | 10/2004 | Olsen |
| 2004/0226012 A1 | 11/2004 | Awada et al. |
| 2004/0250215 A1 | 12/2004 | Chen et al. |
| 2005/0038811 A1 | 2/2005 | Pivowar et al. |
| 2005/0050054 A1 | 3/2005 | Clark et al. |
| 2005/0066335 A1 | 3/2005 | Aarts |
| 2005/0091603 A1 | 4/2005 | Chen et al. |
| 2005/0093868 A1 | 5/2005 | Hinckley |
| 2005/0102629 A1 | 5/2005 | Chen et al. |
| 2005/0117606 A1 | 6/2005 | Kim |
| 2005/0138122 A1 | 6/2005 | Boehringer et al. |
| 2005/0154994 A1 | 7/2005 | Chen et al. |
| 2005/0155017 A1 | 7/2005 | Berstis et al. |
| 2005/0165615 A1 | 7/2005 | Minar |
| 2005/0172241 A1 | 8/2005 | Daniels et al. |
| 2005/0172296 A1 | 8/2005 | Schleifer et al. |
| 2005/0182792 A1 | 8/2005 | Israel et al. |
| 2005/0198299 A1 | 9/2005 | Beck et al. |
| 2005/0203905 A1 | 9/2005 | Jung et al. |
| 2005/0203935 A1 | 9/2005 | McArdle |
| 2005/0256907 A1* | 11/2005 | Novik et al. .................. 707/200 |
| 2005/0262521 A1 | 11/2005 | Kesavarapu |
| 2005/0289265 A1 | 12/2005 | Illowsky et al. |
| 2006/0004600 A1 | 1/2006 | Summer et al. |
| 2006/0010204 A1 | 1/2006 | Jalava et al. |
| 2006/0012301 A1 | 1/2006 | Yang et al. |
| 2006/0026551 A1 | 2/2006 | Shrowty et al. |
| 2006/0028396 A1 | 2/2006 | Starbuck et al. |
| 2006/0041589 A1 | 2/2006 | Helfman et al. |
| 2006/0041893 A1 | 2/2006 | Castro et al. |
| 2006/0066335 A1 | 3/2006 | Kang et al. |
| 2006/0074996 A1* | 4/2006 | Corbett et al. ................. 707/201 |
| 2006/0095507 A1 | 5/2006 | Watson |
| 2006/0106879 A1 | 5/2006 | Zondervan et al. |
| 2006/0123010 A1 | 6/2006 | Landry et al. |
| 2006/0129907 A1 | 6/2006 | Volk et al. |
| 2006/0129917 A1 | 6/2006 | Volk et al. |
| 2006/0143459 A1 | 6/2006 | Villaron et al. |
| 2006/0150004 A1 | 7/2006 | Mizutani |
| 2006/0155821 A1 | 7/2006 | Pichetti et al. |
| 2006/0173985 A1 | 8/2006 | Moore |
| 2006/0184617 A1 | 8/2006 | Nicholas et al. |
| 2006/0190835 A1 | 8/2006 | Cunningham et al. |
| 2006/0206807 A1 | 9/2006 | Rosner et al. |
| 2006/0212792 A1 | 9/2006 | White et al. |
| 2006/0215215 A1 | 9/2006 | Kumaran |
| 2006/0217126 A1 | 9/2006 | Sohm et al. |
| 2006/0218224 A1* | 9/2006 | Agrawal et al. ............... 709/201 |
| 2006/0218492 A1 | 9/2006 | Andrade |
| 2006/0224775 A1 | 10/2006 | Lee et al. |
| 2006/0225137 A1 | 10/2006 | Odins-Lucas et al. |
| 2006/0230021 A1 | 10/2006 | Diab et al. |
| 2006/0230345 A1 | 10/2006 | Weng et al. |
| 2006/0242327 A1 | 10/2006 | Knight et al. |
| 2006/0242549 A1 | 10/2006 | Schwier et al. |
| 2006/0247961 A1* | 11/2006 | Klemow ........................... 705/8 |
| 2006/0253489 A1 | 11/2006 | Kahn et al. |
| 2006/0265395 A1 | 11/2006 | Raman et al. |
| 2006/0265409 A1 | 11/2006 | Neumann et al. |
| 2006/0265518 A1 | 11/2006 | Owens et al. |
| 2006/0282822 A1 | 12/2006 | Weng |
| 2006/0288053 A1 | 12/2006 | Holt et al. |
| 2006/0288329 A1 | 12/2006 | Gandhi et al. |
| 2007/0022174 A1 | 1/2007 | Issa |
| 2007/0038712 A1* | 2/2007 | Affronti et al. ............... 709/206 |
| 2007/0061752 A1 | 3/2007 | Cory |
| 2007/0100959 A1 | 5/2007 | Eichstaedt et al. |
| 2007/0100960 A1 | 5/2007 | Eichstaedt et al. |
| 2007/0106952 A1 | 5/2007 | Matas et al. |
| 2007/0112880 A1* | 5/2007 | Yang et al. .................... 707/201 |
| 2007/0136443 A1 | 6/2007 | Sah et al. |
| 2007/0162517 A1 | 7/2007 | Teegan et al. |
| 2007/0168461 A1 | 7/2007 | Moore |
| 2007/0179989 A1* | 8/2007 | Maes ............................ 707/201 |
| 2007/0204308 A1 | 8/2007 | Nicholas et al. |
| 2007/0250520 A1 | 10/2007 | Dettinger et al. |
| 2007/0276836 A1* | 11/2007 | Chatterjee et al. ............... 707/10 |
| 2007/0294366 A1 | 12/2007 | Ozzie et al. |
| 2007/0299880 A1* | 12/2007 | Kawabe et al. ................. 707/200 |
| 2008/0005081 A1 | 1/2008 | Green et al. |
| 2008/0028442 A1 | 1/2008 | Kaza et al. |
| 2008/0046471 A1 | 2/2008 | Moore et al. |
| 2008/0108744 A1 | 5/2008 | Ishige et al. |
| 2008/0109464 A1 | 5/2008 | Ozzie et al. |
| 2008/0109744 A1 | 5/2008 | Ozzie et al. |
| 2008/0109832 A1 | 5/2008 | Ozzie et al. |
| 2008/0115046 A1 | 5/2008 | Yamaguchi |
| 2008/0126364 A1 | 5/2008 | Khosravy et al. |
| 2008/0141136 A1 | 6/2008 | Ozzie et al. |
| 2008/0144669 A1 | 6/2008 | Lee et al. |
| 2008/0155112 A1* | 6/2008 | Ma et al. ....................... 709/231 |
| 2008/0195739 A1 | 8/2008 | Ozzie et al. |
| 2008/0243874 A1 | 10/2008 | Suthar et al. |
| 2008/0267221 A1 | 10/2008 | Ozzie et al. |
| 2011/0126093 A1 | 5/2011 | Ozzie et al. |

(56) References Cited

U.S. PATENT DOCUMENTS

| | | | |
|---|---|---|---|
| 2013/0014044 | A1 | 1/2013 | Narayanan et al. |
| 2013/0132493 | A1 | 5/2013 | Ozzie et al. |
| 2013/0262972 | A1 | 10/2013 | Ozzie et al. |

OTHER PUBLICATIONS

Leonard et al., "Replicated Document Management in a Group Communication System," Dated Sep. 26-28, 1988 pp. 1-10.

Antoniu, G. et al.; "JUXMEM: An Adaptive Supportive Platform for Data Sharing on the Grid"; No. 4917; INRIA; Sep. 2003.

Apperley, M. et al.; "Breaking the Copy/Paste Cycle: The Stretchable Selection Tool"; AUIC'00 Proceedings of the First Australasian User Interface Conference; 2000; Hamilton, New Zealand.

"Attensa Feed Server—Secure, Scalable Web Feed Server"; retrieved on Dec. 14, 2006; http://www.attensa.com/products/server.

Burcham, B.; "Baby Steps to Synergistic Web App"; Oct. 21, 2005; http://lesscode.org/2005/10/21/baby-steps-to-synergistic-web-apps.

Burcham, B.; "Half a Baby Step"; Nov. 2, 2005; http://lesscode.org/2005/11/02/half-a-baby-step.

Burcham, B.; "Ray Ozzie Got the Memo"; Mar. 22, 2006; http://lesscode.org/2006/03/22/ray-ozzie-got-the-memo.

Cheung, W.L. et al.; "Automatic Device Configuration and Data Validation through Mobile Communication"; IEEE Pacific Rim Conference on Communications, Computers and Signal Processing; Aug. 28-30, 2003; vol. 1, pp. 284-287.

Chmielewski, D. et al.; "A Distributed Platform for Archiving and Retrieving RSS Feeds"; Proceedings of the Fourth Annual ACIS International Conference on Computer and Information Science; 2005.

"Clipboard"; 2006; Microsoft Corporation.

"Ektron CMS200"; retrieved on Dec. 14, 2006; http://www.ektron.com/manuals/datasheets/EktronCMS200-datasheet.pdf.

"Enterprise RSS The Center of Attention"; May 2006; http://attensa.typepad.com/attensa/files/attensa_enterprise_rss_whitepaper_0605.pdf.

"eZine Approach: Understanding OLE"; 2001; Glencoe McGraw-Hill; http://www.glencoe.com/ps/computered/pas/article.php4?articleID-149.

"Freeware RSSOwl | RSS / RDF / Atom Newsreader"; retrieved Feb. 1, 2007; http://www.dirfile.com/rssowl_rss_rdf_atom_newsreader.htm.

"Frequently Asked Questions for Simple Sharing Extensions (SSE)"; MSDN XML Developer Center; retrieved Dec. 14, 2006; http://msdn.microsoft.com/xml/rss/ssefaq.

"Google Data APIs (Beta) Developer's Guide: Google Data APIs Overview"; retrieved Apr. 5, 2007; http://code.google.com/apis/gdata/overview.html.

Gregorio, J. et al.: "The Atom Publishing Protocol"; Mar. 4, 2007; The IETF Trust; http://www.ietf.org/internet-drafts/draft-ietf-atompub-protocol-14.txt.

Hansen, F.A. et al.; "RSS as a Distribution Medium for Geo-spatial Hypermedia"; Proceedings of the 16th ACM Conference on Hypertext and Hypermedia; Sep. 6-9, 2005; Salzburg, Austria.

Hinchcliffe, D.; "How Simple Sharing Extensions Will Change the Web"; Dion Hinchcliffe's Web 2.0 Blog; Nov. 26, 2005; SOAWebServicesJournal.

Kawell, L. et al.; "Replicated Document Management in a Group Communication System"; CSCW'88 Proceedings of the 1988 ACM Conference on Computer-Supported Cooperative Work; Portland, Oregon; Sep. 26-28, 1988.

"Live Clipboard—Wiring the Web"; retrieved Dec. 14, 2006; http://liveclipboard.org.

"Live Clipboard—Technical Introduction"; retrieved Nov. 2, 2006; http://spaces.live.com/editorial/rayozzie/demo/liveclip/liveclipsample/techPreview.html.

"Live Clipboard Screencasts"; retrieved Dec. 14, 2006; http://spaces.live.com/editorial/rayozzie/demo/liveclip/screencast/liveclipdemo.html.

"Live Clipboard Example"; retrieved Dec. 14, 2006; http://spaces.live.com/editorial/rayozzie/demo/liveclip/liveclipsample/clipboardexample.html.

"LiveShare Plus"; PictureTel Corporation; Rev. 01; 1997; http://www.polycom.com/common/pw_cmp_updateDocKeywords/0,1687,573,00.pdf.

"Microsoft Team RSS Blog: More on SSE"; Dec. 7, 2005; http://blogs.msdn.com/rssteam/archive/2005/12/07/501326.aspx.

"Microsoft Team RSS Blog: Simple Sharing Extensions for RSS and OPML"; Dec. 2, 2005; http://blogs.msdn.com/rssteam/archive/2005/12/01/498704.aspx.

"Microsoft Team RSS Blog: SSE Update and Tutorial"; Jan. 25, 2006; http://blogs.msdn.com/rssteam/archive/2006/01/25/517473.aspx.

Miller, R.C. et al.; "Synchronizing Clipboards of Multiple Computers"; Proceedings of UIST'99; Nov. 1999; pp. 65-66.

Nummi, T.; "The Technical Infrastructure of the Live Project"; retrieved Dec. 14, 2006; http://www.edu.helsinki.fi/media/mep6/nummi.pdf.

Obasanjo, D.; "Metadata Quality, Events Database and Live Clipboard"; Apr. 3, 2006; http://www.25hoursaday.com/weblog/PermaLink.aspx?guid=91e40df6-c973-4bf7-8eb6-05c778d8cd90.

Ozzie, J. et al.; "Live Clipboard Version 0.92 XML Schema"; Apr. 21, 2006; http://spaces.live.com/editorial/rayozzie/demo/liveclip/specification/v092.html.

Ozzie, J. et al.; "Simple Sharing Extensions for RSS and OPML"; Version 0.91; Updated Jan. 12, 2006.

Ozzie, R.; "Blog: Really Simple Sharing"; Nov. 20, 2006.

Ozzie, R.; "Blog: Wiring Progress"; Apr. 1, 2006.

Ozzie, R.; "Blog: Wiring the Web"; Mar. 7, 2006.

Rimey, K.; "Version Headers for Flexible Synchronization and Conflict Resolution"; HIIT Technical Report 2004-3; Nov. 22, 2004.

Roisin, C. et al.; "Implementing the Cut-and-Paste Operation in Structured Editing System"; Principles of Documents Processing; Apr. 11-12, 1994; Darmstadt, Germany.

Ross; "Zimbra—Blog—A Pint of ALE—Ajax Linking and Embedding"; Apr. 3, 2006; http://www.zimbra.com/blog/archives/2006/4/simbra_ale-ajax_linking_and_embedding.html.

Schlegel, C.; "Simple Sharing Extensions Up Close . . . "; Nov. 23, 2005; http://kinrowan.net/blog/wp/archives/2005/11/23/sse-up-close.

"Snarfer Download—free RSS reader displays any RSS and Atom news feed"; retrieved on Dec. 14, 2006; http://www.snarfware.com/download.htm.

Spinellis, D.; "Outwit: Unix Tool-based Programming Meets the Windows World"; USENIX 2000 Technical Conference Proceedings; Jun. 2000; Berkeley, California; pp. 149-158.

Stylos, J. et al.; "Citrine: Providing Intelligent Copy-and-Paste"; ACM Symposium on User Interface Software and Technology; Oct. 24-27, 2004; Santa Fe, New Mexico; pp. 185-188.

"The Atom Project"; FrontPage—Atom Wiki; retrieved Apr. 5, 2007; http://intertwingly.net/wiki/pie/FrontPage.

Udell, J.; "Dueling Simplicities"; Infoworld; Nov. 22, 2005.

"vCard: The Electronic Business Card"; A versit Consortium White Paper; Jan. 1, 1997; Version 2.1.

"What Is Atom?"; retrieved Apr. 5, 2007; http://atomenabled.org.

Winer, D.; "RFC: MetaWeblog API"; Mar. 14, 2002; http://www.xmlrpc.com/metaWeblogApi.

Wittenbrink, H.; "RSS and Atom: Understanding and Implementing Content Feeds and Syndication"; Chapter 1; Nov. 8, 2005; Packt Publishing; 37 pages.

Yang, M. et al.; "Deployment of a Large-scale Peer-to-Peer Social Network"; Proceedings of Worlds; 2004; San Francisco, California.

Zaliva, V. et al.; "Enhanced 'enclosures' support in RSS and ATOM Syndication"; Dec. 15, 2004.

U.S. Appl. No. 11/556,998, which is unpublished.

U.S. Appl. No. 11/539,058, which is unpublished.

U.S. Appl. No. 11/609,717, which is unpublished.

"Ray Ozzie's Introduction of Live Clipboard on his blog at"; Retrieved at http://rayozzie.spaces.msn.com/blog/cns!FB3017FBB9B2E142!185.entry; Apr. 1, 2006; 1 page.

(56) References Cited

OTHER PUBLICATIONS

"Simple Sharing Extensions for Atom and RSS"; Jack Ozzie, George Moromisato, Matt Augustine, Paresh Suthar and Steven Lees; May 7, 2007; reprinted from the Internet at http://msdn.microsoft.com/ja-jp/library/bb510102(en-us).aspx.

Marchal, B.; "Working XML: Expand RSS capabilities with RSS extensions"; Retreived ast http://www-128.ibm.com/developerworks/xml/library/x-wxxm36.html; Aug. 15, 2006.

Chudnov, D. et al.; "Introducing unAPI"; Ariadne Issue 48; Retrieved at http://www.ariadne.ac.uk/issue48/chudnov-et-al/; Jul. 2006.

Microsoft Corporation; "Clipboard: Adding Other Formats"; MFC Library Reference; Retrieved at http://msdn2.microsoft.com/en-us/library/838a3whf(vs.80,d=printer).aspx; Retrieved on Nov. 16, 2006.

Burcham, B.; "Ray Ozzie Demos Web App Clipboard"; http://www.memerocket.com/2006/03/21/ray-ozzie-demos-web-app-ciipboard; Mar. 21, 2006.

U.S. Appl. No. 11/621,423, Including O/As dated Sep. 16, 2011; Mar. 21, 2012.

U.S. Appl. No. 11/621,433, Including O/As dated Mar. 14, 2012, and dated Aug. 28, 2012.

Code Guru, "Clipboard copy/paste detection", 17 pages, available at http://codeguru.com/forum/showthread/php?t=343977 (posts dated 2005-2007) ("CodeGuru").

"Copy Structured Data between Web Sites through RSS: Ray's Live Clipboard is Next", reprinted from the Internet at http://www.meternewmedia/org/news/2006/03/31/copy_structured_data_between_web.htm, Mar. 31, 2006, 7 pages.

Goodman, Danny, et al., "JavaScript Bible", John Wiley & Sons, Apr. 8, 2007, ("JavaScript"), 15 pages.

"Ray Ozzie's introduction of Live Clipboard on his blog at", retrieved at <http://rayozzie.spaces.msn.com/blog/cns!FB3017FBB9B2E142!285.entry>; Title of Article: Wiring the Web; Mar. 2007.

U.S. Appl. No. 11/532,390, filed Sep. 15, 2006, Ozzie et. al.
U.S. Appl. No. 13/740,506, filed Jan. 14, 2013, Ozzie et. al.
U.S. Appl. No. 11/557,004, filed Nov. 6, 2006, Ozzie et. al.
U.S. Appl. No. 12/113,214, filed May 1, 2008, Narayanan et. al.
U.S. Appl. No. 11/681,321, filed Mar. 2, 2007, Augustine et. al.
U.S. Appl. No. 11/621,423, filed Jan. 9, 2007, Ozzie et. al.
U.S. Appl. No. 11/621,433, filed Jan. 9, 2007, Ozzie et. al.
U.S. Appl. No. 11/674,046, filed Feb. 12, 2007, Ozzie et. al.

Radic, "Intercept paste event in Text widget", EclipseZone [online], Apr. 10, 2006 [Retrieved Feb. 27, 2014], 7 pages; Retrieved from the Internet: <http://www.eclipsezone.com/eclipse/forums/t69203.html>.

U.S. Appl. No. 13/017,727, filed Jan. 31, 2011, Ozzie, et al.
U.S. Appl. No. 13/897,889, filed May 20, 2013, Ozzie, et al.
U.S. Appl. No. 13/619,442, filed Sep. 14, 2012, Narayanan, et al.

\* cited by examiner

SYNCHRONIZATION ASSOCIATED DUPLICATE DATA RESOLUTION

BACKGROUND

As communication endpoints, including computing devices, are increasingly linked to other endpoints, the use of a variety of techniques for synchronizing data between endpoints has become widespread. Synchronization implementations often include functionality to communicate changes to synchronized data, to communicate new items, to communicate the deletion of items, and so on. Synchronization implementations may also include functionality that minimizes the creation of duplicate items on different endpoints, at least in certain cases.

Many synchronization implementations operate using a "synchronization protocol" that defines characteristics like how data is communicated between endpoints, which data is communicated and when it is communicated, how conflicts are handled when different endpoints modify the same data, and so on.

In some cases, it may be useful for endpoints to communicate using more than one synchronization protocol. Each synchronization protocol may transfer some or all of the same data, but may do so using different operations, different types of communication, and so on, and may provide different benefits. For example, one synchronization protocol may make it possible to synchronize particular data between different endpoints used by a single person. As just one example, and without limitation, such a synchronization protocol might synchronize personal information management (PIM) data by synchronizing each endpoint with a central server or servers. As a result, the single user might be able to access their PIM data on more than one endpoint—they might be able to access, say, their contacts and calendar items on a desktop computer at work, on their home computer, on their mobile phone, and so on. Another exemplary synchronization protocol may make it possible to synchronize the same or other data, say, in a peer-to-peer fashion between different users. When used with PIM data, this other exemplary synchronization protocol may enable users to share contacts, calendar items, and so on, with other people—everyone in the same family might share a set of contacts, for example. While both exemplary synchronization protocols may ultimately synchronize some or all of the same data, they may do so in different ways.

When more than one synchronization protocol is used to transfer the same data, there may be situations where particular pieces of data are transferred, perhaps by both synchronization protocols, and duplicate data is created. For example, while a synchronization protocol may include functionality to minimize the creation of duplicates when data is transferred using just that synchronization protocol, the synchronization protocol may not include functionality to avoid creating duplicate data when another synchronization protocol also synchronizes or transfers the same data.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various techniques directed toward the reduction or elimination of duplicate data that may result when multiple synchronization protocols are used. These techniques may use different types of identification data associated with data that is synchronized, as well as a defined set of operations that may be performed by one or more endpoints to identify and remove duplicated data.

DETAILED DESCRIPTION

The present invention extends to various techniques directed toward the reduction or elimination of duplicate data that may result when multiple synchronization protocols are used. These techniques may use different types of identification data associated with data that is synchronized, as well as a defined set of operations that may be performed by one or more endpoints to identify and remove duplicated data.

Figure 1:
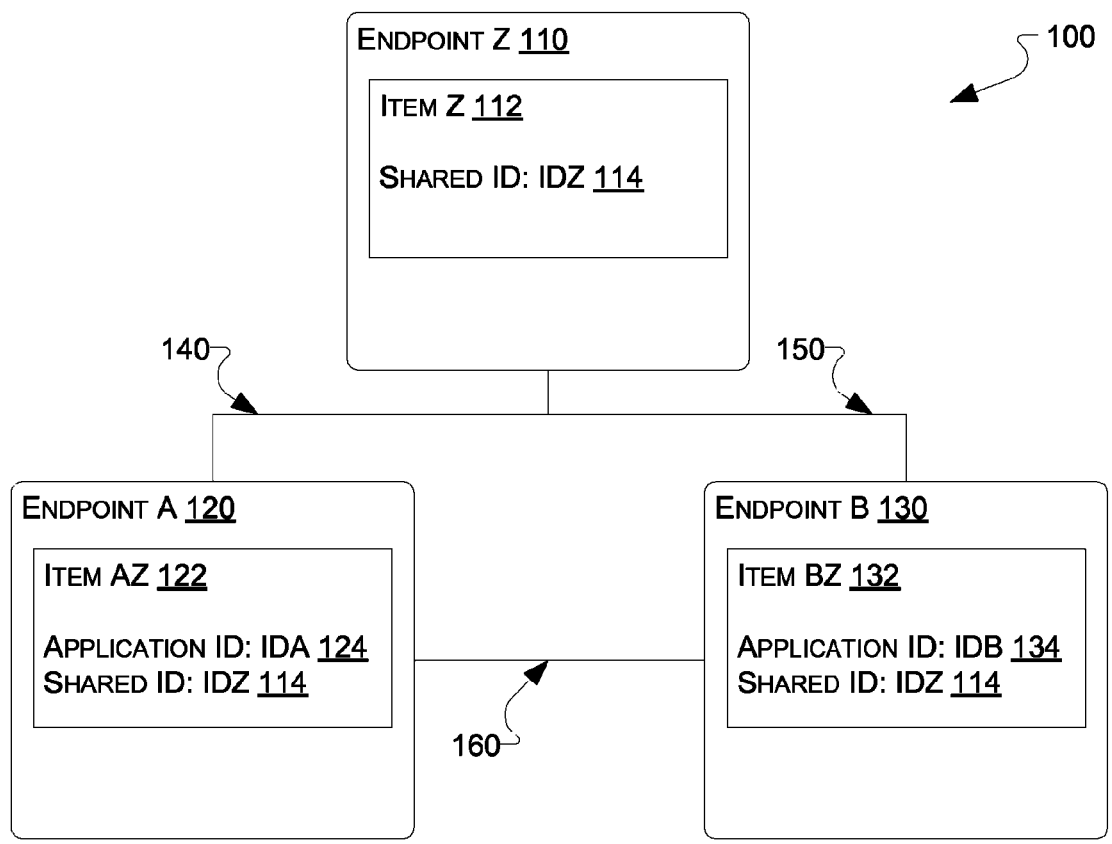
FIG. 1 illustrates an exemplary system that demonstrates just one environment in which synchronization duplication may occur, as well as data and operations that may be used to resolve such duplication.

Turning now to FIG. 1, shown therein is an exemplary system 100 that demonstrates just one environment in which synchronization duplication may occur, as well as data and operations that may be used to resolve such duplication. This description of FIG. 1 may be made with reference to other figures. However, it should be understood that the elements described with reference to FIG. 1 are not intended to be limited to being used with the elements described with reference to other figures. In addition, while the exemplary diagram in FIG. 1 indicates particular elements, in some implementations not all of these elements may exist, and in some implementations additional elements may exist. Furthermore, it should be understood that the exemplary representations of the systems shown in FIG. 1 are provided only for purposes of discussion, and in no way should be construed as limiting the scope of the techniques described herein to any particular representation or implementation.

The exemplary system 100 may contain an endpoint Z 110, an endpoint A 120, an endpoint B 130, a synchronization session 140, a synchronization session 150, and a synchronization session 160. In some cases, endpoint Z may be associated with an item Z 112, which may in turn be associated with a shared ID 114. In the same or other implementations, endpoint A and endpoint B may have an item AZ 122 and an item BZ 132, respectively, which may be associated with an application ID 124 and an application ID 134, as well as with the shared ID 114, in some implementations.

Before discussing how identification data and particular operations may reduce or eliminate duplicate data when multiple synchronization protocols are used, it may be useful to introduce at least one situation in which duplicate data may be created without the use of such duplicate reduction operations. In summary, and without limitation, in one example, a new item Z 112 might be created on endpoint Z 110. The item Z might be synchronized with endpoint A 120 via the synchronization session 140, which might result in the creation of the local item AZ 122. Similarly, item Z 112 might be synchronized with endpoint B 130, this time via the synchronization session 150, and this synchronization might result in the creation of the local item BZ 132. Until this point, no duplicate items may have been created. However, now suppose that endpoint A and endpoint B also synchronize data, including one or both of item AZ and item BZ, using the synchronization session 160. Also further suppose that the synchronization session 160 uses a different synchronization protocol than the synchronization protocols used, perhaps, by the synchronization sessions 140 and 150, and perhaps as a result that duplicate detection operations associated with the synchronization protocols used by the synchronization sessions 140 and 150 may not affect the synchronization session 160. In at least such a case, item BZ might be synchronized from endpoint B to endpoint A and this might result in the creation of a new item (not shown) on endpoint A, where the new item is a duplicate of item AZ.

In at least some more detail, each endpoint may be associated with a variety of data that may be synchronized using a variety of mechanisms with one or more other endpoints. For example, endpoint Z 110 may be associated with a variety of data. Endpoint Z may synchronize some or all of this data with endpoint A 120. Endpoint Z may also synchronize some or all of this data with endpoint B 130. The data associated with each endpoint may be located locally on that endpoint— for example, on disk storage that is part of the same computing device—or may be located remotely on one or more types of networked or other remote storage connected via any suitable communication media.

In at least one exemplary implementation, a user, process, some executable code, or so on, may create an item, such as item Z 112, on endpoint Z 110. While item Z may represent any kind of data, again for purposes of example, it may be considered to represent, say, a calendar item. In some implementations, for example, endpoint Z may be a computer located, say, at a user's home. Such a user might create an exemplary item Z by using a PIM application to create a new appointment or calendar item. As part of the creation of item Z, item Z may be assigned or associated with one or more particular pieces of identifying data, such as a number or numbers. For example, item Z may be associated with the shared ID 114, which may have the value "IDZ." Of course, the identifier might be represented using any of a variety of means including numbers, globally unique identifiers created using one or more rules for the generation of globally unique identifiers, and so on. It should be noted that while some IDs—such as the shared ID 114, in some cases and at some times—may be shared, say, between different endpoints, that identifiers and IDs do not have to be shared, or even when shared at some times do not have to be shared at all times. Furthermore, "application" IDs may in some cases be associated with one or more applications, processes, or the like, but do not have to be associated with such applications, processes, and so on.

In some exemplary implementations, endpoint Z 110 may synchronize data with endpoint A 120. Endpoint Z and endpoint A may synchronize data using a synchronization session 140. For example, suppose that endpoint Z synchronizes all calendar items with endpoint A. When item Z 112 is created on endpoint Z, endpoint Z may use a synchronization session 140 to communicate the new item Z, or data associated with the new item Z, to endpoint A. The synchronization session 140 may use a variety of synchronization protocols, where a synchronization protocol generally defines a set of rules to be followed and data to be communicated during synchronization. For example, in one implementation (perhaps different than at least some of the previous and subsequent examples), endpoint A might include a PIM application, such as the Microsoft Outlook application produced by Microsoft Corporation of Redmond, Wash., and endpoint Z might comprise a server that includes server PIM functionality associated with instances of the PIM application running on endpoint A, such as an instance of Microsoft Exchange Server. In such an example, endpoint A and endpoint Z might communicate using synchronization sessions that use a synchronization protocol understood by the PIM application and the server. Such a synchronization protocol may define a variety of information necessary for the endpoints to synchronize data, including, for example and without limitation, when changes should be communicated, the underlying networking or communication protocols to be used, what data should be communicated at what times, and so on.

In another example, endpoint A and endpoint Z may be connected through another synchronization protocol, including, for example, the synchronization protocol defined by the Simple Sharing Extensions (SSE) specification. The SSE specification defines additional data elements and a set of rules that may be used with an existing data interchange protocol, like Rich Site Summary/Really Simple Syndication (RSS) or Atom, to synchronize data. For example, one might publish an RSS, Atom, or other feed that contains data items. An endpoint, or more than one endpoint, might subscribe to the feed and be notified when, for example, new items are added or existing items are changed. In addition, a subscribing endpoint might publish its own feed, with the same data that is provided in the original publisher's feed and also with changes or additions made by the subscriber. The original publisher might then subscribe to this second feed. Through these mutual subscriptions, changes made by either endpoint may be reflected in the data maintained by both endpoints. SSE may also provide other functionality, including, for example, methods for operating with conflicts that can occur, for example, when multiple endpoints change the same item independently.

It is common for synchronization protocols to use one or more identifying values when synchronizing data. Such values may enable a synchronization protocol to, among other things, determine data that has been synchronized, track data that has changed and has or has not been synchronized, and so on. In some cases, each item synchronized between endpoints may maintain a single identifying value. This may be the case, for example, when a synchronization protocol is tied or closely associated with the data being synchronized. As just one specific example, when a calendar item is created by a PIM application and synchronized to and from a PIM server using a synchronization protocol defined by or associated with the PIM system—as might be the case with Microsoft Outlook and Microsoft Exchange Server, for example—the synchronization protocol may use an identifying value for each item of data where the identifying value is defined and managed by the PIM system.

In other cases, including those where the synchronization protocol in use is not tied or associated specifically with the data being synchronized, other additional identifying values may be introduced or used during synchronization. Again, as just one example, SSE may specify that a unique "SSE ID" be used for each piece of data synchronized with SSE. If SSE, or some other protocol that defines or uses its own or other identifying values, is used to synchronize data that already has associated identifying values, each piece of data may ultimately be associated with multiple identifying values or IDs.

Returning to the elements of FIG. 1, one instance in which multiple IDs may be associated with a single piece of data or item may be illustrated by item AZ 122 that is associated with endpoint A 120. First, before any synchronization with endpoint A or the creation of item AZ, item Z 112 may have been created on endpoint Z 110. (Item Z may have been created on endpoint Z as a result of a variety of operations: it may have been created locally on endpoint Z, it may have been created as a result of synchronizing data from some other endpoint—perhaps not shown—to endpoint Z, and so on.) While item Z may be or include any type of data, for the purposes of explanation and without limitation, item Z may be considered to comprise a calendar item or appointment maintained in a PIM system.

At some point, item Z 112 may be synchronized from endpoint Z 110 to endpoint A 120, perhaps using a synchronization session 140 that uses a particular synchronization protocol. The synchronization session may include or transmit a "new item instruction" that, in some implementations, includes both "item information" as well as "item metadata." In this context, item information may be understood to comprise any information associated with the item that is not item metadata—that is, it may be understood to comprise any information that is not data about the item data. For example, in a calendar item or appointment, item information might include a description of the appointment or event, the location of the appointment, a time or time range associated with the appointment, and so on. A single exemplary calendar item might have item information like "Doctor Appointment at 123 $1^{st}$ Street, from 2:00 pm to 3:00 pm." In contrast, "item metadata" may be comprised of information associated with the item like one or more item identifiers that might be, for example, defined or created when the item is first synchronized, when the item is created, or at some other time. For example, when item Z is created or when item Z is first synchronized, item Z may be assigned a shared ID 114, perhaps with the value "IDZ." In some cases, both item information and item metadata may be simply considered to be "item data," and a division between types of data may not be useful. It should also be noted that a "new item instruction" may not necessarily refer to an item that an endpoint has never received before, and may not necessarily result in the creation of a new item on a recipient endpoint. For example, with some synchronization protocols, particular (or perhaps all) items may be included in each synchronization session and, for example, a recipient endpoint may determine if any of the items are new or need to be created on the recipient endpoint.

When endpoint A 120 receives the new item instruction, it may perform a variety of operations as part of determining if a new item should be created locally and, if so, the data that the new local item should use. For example, the synchronization protocol used in the synchronization session 140 may specify that endpoint A should only create a new item locally if it does not already have a local item with the same shared ID that is communicated as part of the new item instruction. In this example, if endpoint A receives a new item instruction for item Z that includes a shared ID value of "IDZ," it may examine its own local data to determine if it already has an item with a shared ID that has a value of "IDZ." If it already has an item with a shared ID value of "IDZ," it may not create a new item.

In contrast, in this example if endpoint A does not have an item with the shared ID value of "IDZ," it may use some or all of the item information and possibly the item metadata communicated as part of the synchronization session to create a new local item. Such a new local item may be represented by item AZ 122 and may be, for example, a calendar item that has the same item information (like "Doctor Appointment," and so on, as previously explained). In some cases, item AZ may have its own application ID, such as application ID 124 with the value "IDA." This may be the case, as just one example and without limitation, when the endpoint maintains its data separate in some manner from the synchronization protocol from which the new item was created. For example, endpoint A might maintain calendar items using a PIM application and the PIM application's associated data store. When it receives new calendar items as part of a synchronization session that uses a synchronization protocol that is, for example, not closely associated with the PIM application, it may create new calendar items using, for example, a local application programming interface (API) provided by the PIM application. In such an example, the PIM application may not have any specific knowledge of the synchronization session, synchronization protocol, or from where the calendar item information was defined or provided. As a result, the PIM application may assign its own, or another, ID to the new item. Such an ID, in this example, might be represented by the application ID 124 that in this example has a value of "IDA."

In some implementations, including those that do not perform duplicate detection as described herein, the shared ID that was provided, for example, as part of the new item instruction, may not be saved after an item is created. However, as will be explained below in more detail, the shared ID may be useful for resolving synchronization duplication and therefore, or for other reasons, may in some implementations be saved when a new item is created. The manner in which the shared ID may be saved may vary depending on a variety of factors, including the manner in which the new item is created. For example, some PIM applications may provide the ability to store arbitrary additional data with items maintained by the PIM application. In such a case, the shared ID may be stored directly with the new item. In another case, the shared ID may be stored in some data structure or store that is separate from the new item. For example, the shared ID may be stored in a database or in-memory data structure like a hash table, indexed by or linked to the application ID of the new item. With such an arrangement of data, the shared ID for a particular item may be determined by looking up the application ID of the item and retrieving the associated shared ID.

Continuing with the example that will ultimately demonstrate one manner in which duplicate items might be created, as well as how the existence of such duplicate items might be resolved, consider that endpoint B 130 may also synchronize data—perhaps including calendar items—with endpoint Z 110. At some point after the new item Z 112 exists on endpoint Z, it may be synchronized, perhaps using the synchronization session 150, with endpoint B. In just one example, and without limitation, suppose that the synchronization session 150 uses the same synchronization protocol as the synchronization session 140 and, as a result, item BZ 132 is created locally on endpoint B in the same or similar fashion as item AZ 122 was created on endpoint A 120. As such, item BZ may have its own application ID 134, this time with a value of "IDB." In this example, both item AZ and item BZ were created locally on their own endpoint as part of synchronizing with endpoint Z and so may each have their own, different, application ID, even though they are conceptually the same item, may have the same item information, and so on. In implementations where the shared ID may be stored or associated with local items, both item AZ and item BZ may have the same shared ID, as both items were created after synchronizing the item Z 112.

Now, consider a third synchronization session 160 that synchronizes data—perhaps in this example including calendar items—between endpoint A 120 and endpoint B 130. In this example, the synchronization session 160 may use a different synchronization protocol than the synchronization protocol used by the synchronization session 140 and the synchronization session 150. For example, the synchronization session 160 may use a protocol that is associated with the data stored by endpoint A and endpoint B. In this example, with calendar items, the synchronization protocol might be a synchronization protocol for the PIM applications in use on endpoint A and endpoint B. (Such a synchronization protocol may operate directly between endpoint A and endpoint B, may operate using one or more intermediary servers that are not shown, or may operate in some other topology.)

In a specific but non-limiting example, suppose that endpoint A 120 is configured to receive all new, changed, or deleted calendar items that exist on endpoint B 130, using the synchronization session 160. At some point after item BZ 132 is created on endpoint B, item BZ will be synchronized with endpoint A. In this case, as introduced previously, the synchronization protocol may be different than the synchronization protocol previously used to synchronize the item from endpoint Z. This synchronization protocol, for example, may have no inherent knowledge of the shared IDs that may or may not be associated with item AZ and item BZ. Instead, it may only use, for example, the application IDs associated with the items. As part of this synchronization, endpoint A may receive a new item instruction from endpoint B. Then, as part of processing this new item instruction, endpoint A may determine if it already has an item with the same application ID as the incoming item BZ with application ID 134, and if so, may determine that it already has the item that is the subject of the new item instruction. However, in this case, while both item AZ and item BZ have been created as a result of the existence of the same item Z, and both items may have the same item information, their application IDs are different. As a result, endpoint A may determine that it does not have item BZ already, because it does not have an item with an application ID that has the value "IDB." As a result, endpoint A may create a new local item. Ultimately, endpoint A may have two local items when it should only have one: it may have item AZ that it created using the synchronization session 140, and another item based on item BZ that it created using the synchronization session 160.

However, this problem may be resolved, and only a single item may remain, through additional processing. For example, and in summary, as part of processing a new item instruction, and in addition to examining the application ID of the incoming item, endpoint A might also examine the shared ID of the incoming item. If endpoint A already has an item with the same shared ID as the item that is being communicated as part of a synchronization session, regardless of the new item's application ID, it may also consider that the item is actually a duplicate item. In the case where items have the same shared ID, additional processing may be performed so that only a single item is kept, and items are not duplicated. Some examples of such additional processing are provided below with reference to FIG. 2.

Such additional processing and the operations described to resolve a duplicate detected in a manner like this may not be a part of the "normal" synchronization processing that an endpoint might perform. That is, the additional processing necessary to detect and resolve duplicate items when multiple synchronization protocols are used may not generally be part of the normal processing defined for a particular synchronization protocol. In such cases the additional processing may be integrated or used with the endpoint using a variety of integration means. For example, as introduced previously, when endpoint A 120 synchronizes with endpoint B 130, it may use a synchronization protocol that is closely associated with the data being transferred—with a PIM application, for example. Such a synchronization protocol may have no specific knowledge of the shared ID information that may be associated with each item, and may not know how to use such information. However, the PIM application, for example, may have "hooks" or other connecting points where additional processing or executable code may be integrated or called. For example, a PIM application might define a manner in which additional executable code can be registered so the PIM application calls the additional executable code whenever the PIM application is about to create a new item. In such a case, the processing that identifies and resolves duplicates, as described previously and also as described below, for example, with reference to FIG. 2, might be registered to be called in such a manner, and so might be integrated with the processing that is already part of the implementation of the synchronization protocol.

While in at least one example item Z is communicated between endpoints, it should be noted that data may be transmitted in a variety of ways between endpoints that synchronize data. For example, when another item is created on endpoint Z, another instance of a synchronization session may be created so the new item may be similarly transmitted. In the same or other implementations, a single synchronization session may transmit multiple changes. Furthermore, if changes on endpoint A are being transmitted to endpoint Z—as they might be, for example, in a bidirectional synchronization relationship—then endpoint A might initiate or use a synchronization session to communicate changes to endpoint Z. Furthermore, while some specific examples of synchronization protocols have been defined and are used herein for explanatory purposes, generally any synchronization protocol may be used to synchronize data. It should also be noted that, as used herein, phrases like "send the item," "communicate the item between endpoints," and so on, may not actually refer in at least some implementations to the communication of the item itself. Instead they may refer to, for example, the communication of at least some data associated with the item, where the data is sufficient for the receiving endpoint to be able to recreate the item or use the item in some form.

It should be noted that, in this example, endpoint Z 110, endpoint A 120, and endpoint B 130 may each be a computing device of any of a variety of types, including those described below, for example, with reference to FIG. 3. Each endpoint may also be embodied in one or more applications running on any of a variety of computing devices, of any type. In some cases, the different endpoints may be implemented on different computing devices, while in other cases more than one endpoint may be implemented on the same computing device (for example, as separate applications, processes, or the like).

Figure 2:
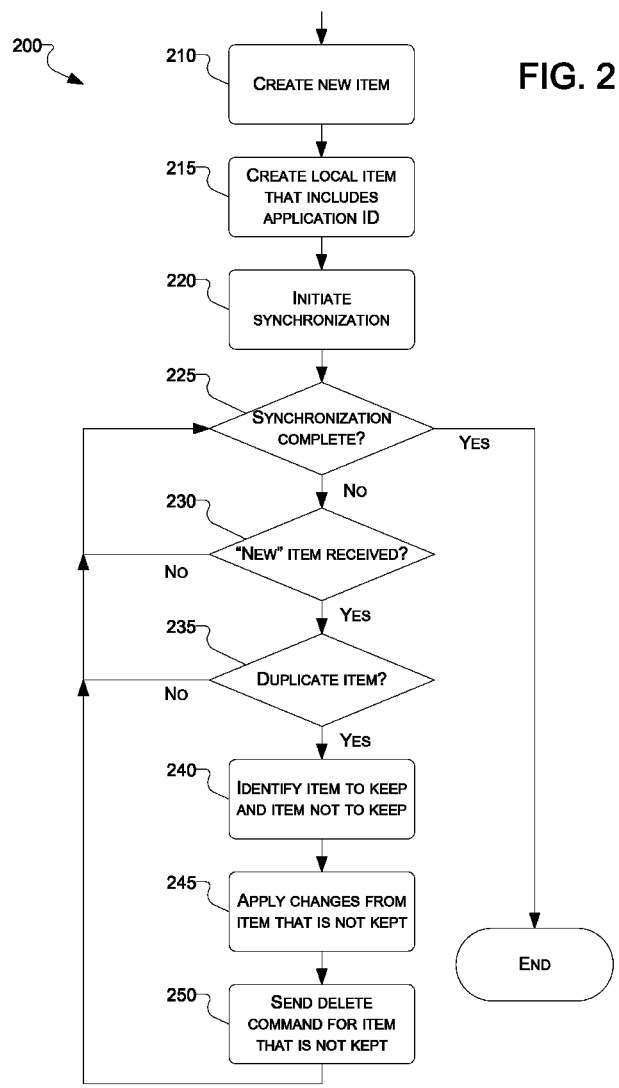
FIG. 2 illustrates an exemplary generalized operational flow including various operations that may be performed when detecting and resolving synchronization duplication.

Turning now to FIG. 2, shown therein is an exemplary generalized operational flow 200 including various operations that may be performed when detecting and resolving synchronization duplication. The following description of FIG. 2 may be made with reference to other figures. However, it should be understood that the operational flow described with reference to FIG. 2 is not intended to be limited to being used with the elements described with reference to these other figures. In addition, while the exemplary operational flow of FIG. 2 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In at least one implementation of operation 210, a new item may be created on some endpoint. In the context of this operational flow, this item may be referred to as being created on a "remote" or "parent" endpoint, at least in the sense that the item may be created on an endpoint that is different than the endpoint that creates a "local" item, as described below. For example, a new item may be created on a remote endpoint like endpoint Z 110 described previously with reference to FIG. 1. The new item may be created on the remote endpoint as a result of a variety of actions or operations, including when a user creates the new item manually on the remote endpoint, when the new item is created on the remote endpoint as a result of some other synchronization performed by the remote endpoint with yet another endpoint, and so on.

The item created on the remote endpoint may have item information that is associated with the item. For example, if the item is a calendar item or appointment, the item information may include a description of the appointment, and so on, as described previously. Of course, the item could hold any kind of information, in a variety of formats.

In an exemplary implementation of operation 215, a local endpoint may create a local item that may be associated with the item created on the remote endpoint in operation 210. For example, the local endpoint may synchronize with the remote endpoint and, as a result of the new item on the remote endpoint, may create its own local copy of the item, so that both endpoints are synchronized and have the same items. For example, the local item created in this operation may in some cases be analogous to item AZ 122 associated with the endpoint A 120, which might itself be the local endpoint, and both described previously with reference to FIG. 1.

As a result of the synchronization between the local and remote endpoints, the local item may generally have the same item information as the item on the remote endpoint. If the original item on the remote endpoint was a calendar item with a description of "Doctor Appointment," the local item would likely have the same description, and so on. The local item may also have other data, including item metadata, where at least some of the data may be different from the corresponding item on the remote endpoint. For example, as part of creating the item locally, the local item may have been assigned an application ID. Such an application ID might not have been provided during the synchronization request and might therefore be unknown to the remote endpoint. In some implementations, such an application ID may be the same as or similar to the application ID 124 of item AZ 122, both described previously with reference to FIG. 1.

The local item may also have or be associated with a shared ID in some fashion. The shared ID may have been created or defined in a variety of ways. For example, it might have been assigned, perhaps by the remote endpoint, to the item synchronized by the remote endpoint. (Perhaps as a result, if the remote endpoint synchronizes the same remote item with an endpoint that is different from the local endpoint discussed here, the shared ID may remain the same.) The local item may in some cases store the shared ID directly, while in other cases the shared ID may be associated with the local item in another manner, like through the use of a hash or table of application IDs and shared IDs, as described previously. In some cases, the shared ID may be the same as or similar to the shared ID 114 that is shown as associated with item AZ 122, both of FIG. 1.

In an exemplary implementation of operation 220, a synchronization session may be initiated. Such a synchronization session may occur between the local endpoint introduced previously in operation 215 and some other endpoint that is different from the remote endpoint, and might use a different type of synchronization protocol than the synchronization protocol that might have been used, for example, when the local item was created in operation 215. In just one example, the synchronization session of operation 220 may be the same as or similar to the synchronization session 160 of FIG. 1, which occurs between endpoint A 120 and endpoint B 130, both also of FIG. 1.

In at least one exemplary implementation of operation 225, it is determined if the synchronization session initiated in operation 220 is complete. In this context, a synchronization session may be determined to be "complete" in a variety of ways, depending on characteristics like the nature of the synchronization protocol. As just one example, as defined by the synchronization protocol, a remote endpoint might provide a list of one or more items that may be new, have changes, or may be deleted. As a result, each iteration of particular operations in this operational flow (such as operation 230, operation 235, operation 240, operation 245, and operation 250) may operate on one such item. When all of the items in the list have been processed, the synchronization session may be complete. When other synchronization protocols are used, the synchronization session may be determined to be complete based on other criteria. Regardless of the criteria, when the synchronization session is complete, the operational flow may end. If the synchronization session is not complete, and additional items may need to be processed, for example, then the operational flow may proceed to operation 230.

In at least some implementations of operation 230, it may be determined if the item being processed is a new item. The determination of whether the item is a new item may be relevant because, for example, in some cases duplicate items are not created as a result of instructions that are not related to creating new items. That is, duplicate items may not in some cases be created as part of changing existing items or deleting existing items. In such cases, or in at least some other cases, if the item being processed is not considered to be a "new item," the operational flow may proceed to operation 225, where another item in a list of items that are part of the synchronization session may be identified or the synchronization session may end. In contrast, if the item is or may be a new item and so duplicate detection and processing may be useful, the operational flow may proceed to operation 235.

In an exemplary implementation of operation 235, it may be determined if the item being processed is a duplicate of another item that already exists on the local endpoint. While a variety of existing synchronization protocols may perform operations to detect and resolve duplicates, this operation may specifically use existing identifying data, like the shared ID, to detect duplicates. Specifically, in this operation, the application ID of the local item, and the corresponding application ID of the item being considered or processed as part of the synchronization may not be used. Instead, the local endpoint may execute code that identifies the shared ID of the item being presented and determines if it is the same as any shared ID associated with an item that already exists locally. This may detect a duplicate that would not otherwise be detected during a "normal" synchronization session, in the same way that has been described previously with reference to FIG. 1. If the item being considered as part of the synchronization session is identified as a duplicate because it has the same shared ID as an item that already exists locally, the operational flow may proceed to operation 240. Otherwise, the operational flow may proceed to operation 225, where another item in a list of items that are part of the synchronization session may be identified or the synchronization session may end.

In an exemplary implementation of operation 240, one of the duplicate items may be selected as the item to keep. The item that is not selected may then, in some implementations, be deleted in a subsequent operation. This operation may be performed when a local item and an incoming item presented as part of a synchronization session have been identified as being duplicates, as previously described. This operation may then choose or select one of either the local item or the incoming item as the "item to keep," and then select the other item as the "item not to keep." Both items may be determined in a variety of manners. For example, in one implementation, the application IDs of both items—which again may be different if they have been created, for example, on separate endpoints as has been previously described—may be sorted in some fashion, like through the use a normal alphanumeric sort, and the item to keep may be determined to be the item that has the higher or lower application ID value. For example, item AZ 122 of FIG. 1 has an application ID 124 with a value of "IDA," and item BZ 132, also of FIG. 1, has an application ID 134 with a value of "IDB." If item AZ is the local item and item BZ is the incoming item, and their application IDs are sorted alphanumerically, item BZ might be determined to be the "item to keep" because its application ID has a greater alphanumeric sort value than the application ID of item AZ.

Regardless of the specific steps used to determine an item to keep and an item not to keep, it may in some implementations be important that the steps be designed so that their execution always produces the same result, regardless of at least some other factors including, for example and without limitation, the point in time at which the steps are executed, on what endpoint the steps are executed, and so on. Without a guarantee of such "deterministic" behavior, different endpoints might choose, for example, different items to keep and not to keep, which might result in unpredictable or possibly undesirable behavior, such as item deletions that are not desired.

In an at least one implementation of operation 245, changes that might be associated with the item that was selected as the "item not to keep" may be considered and possibly applied, merged, or changed on the item to keep. This operation may be performed to avoid losing information or data on an item that is going to be deleted. For example, one case in which a change might be applied or merged might be where the item not to keep has been changed and has at least some information that is different from the original item from which both the item to keep and item not to keep were created. In such a case, without any further processing, these changes may be lost when the item not to keep is deleted. To avoid this occurrence, if possible, it may be desirable to update the item to keep in some fashion so that it also reflects the changes that exist on the item not to keep. It should be noted that updating the item to keep may not always be desirable or possible. This might be the case, in just one example, when both the item to keep and the item not to keep have been updated after they were created based on the original item, and the changes exist to the same parts of the item information or are mutually exclusive. In such a case, some changes may be lost, or the conflict between the changes may be handled or processed in some other fashion.

Finally, in an exemplary implementation of operation 250, a delete command may be sent to delete the item that was selected as the item not to keep in operation 240. When this item is deleted, only a single item may remain, and the duplicate situation detected in operation 235 may be resolved. Depending on particular factors, like the nature of the synchronization protocol or protocols in use, the manner in which the delete command is sent may be different and might ultimately result in a variety of actions. For example, in some cases the item not to keep may be deleted locally, and such a local deletion may then be synchronized, as part of this synchronization session or as part of a later synchronization session, to other endpoints. Because multiple endpoints may perform duplicate detection and resolution processing before such a later synchronization, the synchronization protocols or applications may need to be robust in the face of deletion commands for items that have already been deleted.

Example Computing Environment

Figure 3:
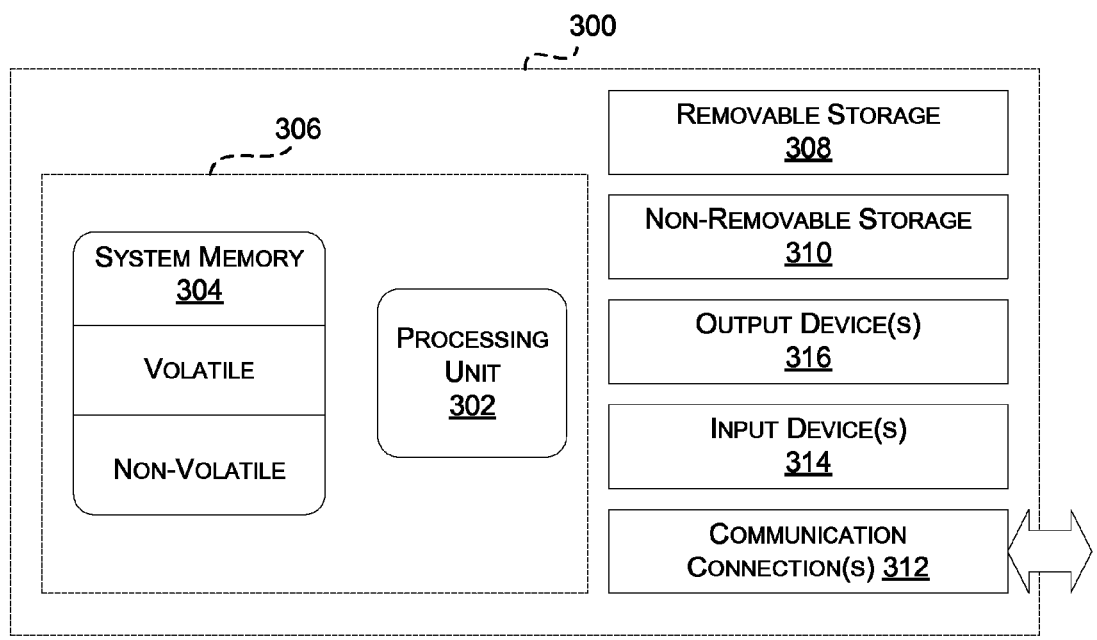
FIG. 3 illustrates an exemplary computer device in which the various technologies described herein may be implemented.

Turning now to FIG. 3, this figure and the related discussion are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 300 illustrated in FIG. 3.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 300 illustrated in FIG. 3, in its most basic configuration, includes at least one processing unit 302 and memory 304. In some implementations, the computing device 300 may implement all or part of, for example, a computer system that might provide a communication endpoint like the endpoint Z 110, endpoint A 120, or endpoint B 130 described previously with respect to FIG. 1. In some implementations, the processing unit 302 may be a general purpose central processing unit (CPU), as exists, for example, on a variety of computers, including desktop and laptop computers. Depending on the exact configuration and type of computing device, the memory 304 may be volatile (such as RAM), non-volatile (such as ROM, flash memory, and so on), or some combination of the two. This most basic configuration is illustrated in FIG. 3 by dashed line 306. Additionally, the computing device 300 may also have additional features and functionality. For example, the computing device 300 may also include additional storage (removable and/or non-removable) including, but not limited to, magnetic or optical disks or tape. Such additional storage is illustrated in FIG. 3 by the removable storage 308 and the non-removable storage 310.

The computing device 300 may also contain one or more communications connection(s) 312 that allow the computing device 300 to communicate with other devices and services. For example, the computing device might have one or more connections to other computing devices and use such connections to transmit or receive synchronization data, as described previously with reference to FIG. 1 and to FIG. 2. The computing device 300 may also have one or more input device(s) 314 such as an image input devices like cameras or scanners, keyboards, mice, pens, voice input devices including microphone arrays, touch input devices, and so on. One or more output device(s) 316 such as a display, speakers, printer, and so on, may also be included in the computing device 300.

Those skilled in the art will appreciate that the technologies described herein may be practiced with computing devices other than the computing device 300 illustrated in FIG. 3. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 3, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A method performed by a local endpoint having a local instance of a Personal Information Management (PIM) application, the method comprising:
receiving, from a first remote endpoint, a first new item instruction for a first item during a feed synchronization session using a feed synchronization protocol comprising rules for communicating data, wherein:
the first new item instruction comprises first item information and a feed ID that is assigned to the first item information by the feed synchronization protocol, and
the first new item instruction is received from the first remote endpoint by subscribing to a feed that uses the feed synchronization protocol;
responsive to receiving the first new item instruction, creating a local instance of the first item on the local endpoint, wherein the local instance of the first item is created on the local endpoint and assigned a first application ID by the local instance of the PIM application, wherein the first application ID is different than the feed ID and the local instance of the first item includes the first item information;
synchronizing with a second remote endpoint by receiving a second new item instruction from a second instance of the PIM application on the second remote endpoint, the second new item instruction identifying a second item and being received during a PIM application synchronization session using a PIM application synchronization protocol, wherein:
the second item identified by the second new item instruction received from the second remote endpoint is also assigned the feed ID assigned by the feed synchronization protocol,
the second item is received with a second application ID assigned by the second instance of the PIM application on the second remote endpoint, the second application ID being different than the first application ID and the feed ID, and
the PIM application synchronization protocol is particular to the PIM application, comprises different rules than the feed synchronization protocol, and is not used for the feed to which the local endpoint is subscribed;
determining that the local instance of the first item having the first application ID and the second item received with the second application ID are duplicates based on both the first item and the second item being assigned the feed ID;
determining that the second application ID is greater than the first application ID; and
responsive to determining that the second application ID is greater than the first application ID, storing the second item on the local endpoint and deleting the local instance of the first item from the local endpoint,
wherein the local endpoint is a computing device other than the first remote endpoint and the second remote endpoint.

2. The method of claim 1, further comprising:
merging a change from the local instance of the first item into the second item.

3. The method of claim 1 wherein the local instance of the first item and the second item are different versions of a calendar item.

4. The method of claim 1 wherein the determining that the second application ID is greater than the first application ID comprises sorting the first application ID and the second application ID alphanumerically.

5. The method of claim 1 wherein the fir-st-feed synchronization protocol uses Simple Sharing Extensions.

6. The method of claim 1 wherein the first remote endpoint and the second remote endpoint are different devices.

7. The method of claim 1,
wherein the feed ID is a unique Simple Sharing Extensions ID.

8. The method of claim 1, further comprising synchronizing the deleting with at least one endpoint that is not the local endpoint.

9. One or more hardware computer-readable memory devices or hardware storage devices containing computer-executable instructions that, when executed, implement the following operations on a local endpoint having a local instance of a Personal Information Management (PIM) application:
subscribing to a feed provided by a first remote endpoint to at least the local endpoint and a second remote endpoint, the feed using a feed synchronization protocol to communicate between the first remote endpoint and the local endpoint and between the first remote endpoint and the second remote endpoint;
receiving, a first new item instruction for a first item during a feed synchronization session with the first remote endpoint, the feed synchronization session using the feed synchronization protocol wherein the first new item instruction comprises first item information and a feed ID that is assigned by the first remote endpoint to the first item to implement the feed synchronization protocol;

responsive to receiving the first new item instruction, causing the local instance of the PIM application to create a local instance of the first item, wherein the local instance of the first item is assigned a first application ID and includes the first item information;

synchronizing with the second remote endpoint by receiving, from a second instance of the PIM application on the second remote endpoint, a second new item instruction identifying a second item during a PIM application synchronization session using a PIM application synchronization protocol that is associated with the PIM application and uses different rules for communicating data than the feed synchronization protocol, wherein the second item is received with a second application ID assigned by the second instance of the PIM application and the second item is also assigned the feed ID;

determining that the local instance of the first item and the second item are duplicates based on both the first item and the second item being assigned the feed ID;

determining that the second application ID is greater than the first application ID; and responsive to determining that the second application ID is greater than the first application ID, storing the second item on the local endpoint and deleting the local instance of the first item from the local endpoint.

10. The one or more hardware computer-readable memory devices or hardware storage devices of claim 9, wherein the PIM application synchronization protocol does not have knowledge of the feed ID.

11. The one or more hardware computer-readable memory devices or hardware storage devices of claim 9, wherein the second item comprises a new appointment or calendar item.

12. The one or more hardware computer-readable memory devices or hardware storage devices of claim 9, wherein the feed synchronization protocol comprises at least one of Rich Site Summary/Really Simple Syndication (RSS) data interchange protocol or Atom data interchange protocol.

13. A local endpoint having a local instance of a Personal Information Management (PIM) application, the local endpoint comprising:

a memory storing instructions configured to:
subscribe to a feed provided by a first remote endpoint to at least the local endpoint and a second remote endpoint having a second instance of the PIM application, the feed using a feed synchronization protocol and the PIM application using a separate PIM application synchronization protocol;
receive, from the first remote endpoint, a first new item instruction for a first item during a feed synchronization session of the feed, wherein the first new item instruction comprises first item information and a feed ID that is assigned by the first remote endpoint to the first item information to implement the feed synchronization protocol;
responsive to the first new item instruction, cause the local instance of the PIM application to create a local instance of the first item and assign a first application ID to the local instance of the first item, wherein the local instance of the first item is associated with the feed ID and includes the first item information;
synchronize the local instance of the PIM application with the second instance of the PIM application using the PIM application synchronization protocol by receiving, from the second instance of the PIM application, a second new item instruction identifying a second item, wherein the second item is received with both a second application ID assigned by the second instance of the PIM application and the feed ID assigned by the first remote endpoint;
determine that the local instance of the first item and the second item are duplicates based on both the first item and the second item being assigned the feed ID;
make a determination that the second application ID is greater than the first application ID; and
responsive to the determination that the second application ID is greater than the first application ID, store the second item on the local endpoint and delete the local instance of the first item from the local endpoint; and
a hardware processor configured to execute the instructions.

14. The local endpoint of claim 13, wherein the instructions are further configured to merge changes from the first item into the second item.

15. The local endpoint of claim 13, wherein the instructions are further configured to synchronize deletion of the first item to other endpoints.

16. The local endpoint of claim 13, wherein the instructions are further configured to look up the second application ID in a database to retrieve the feed ID of the second item.

17. The local endpoint of claim 16, wherein the instructions are further configured to look up the second application ID in a hash table to retrieve the feed ID of the second item.

18. The local endpoint of claim 13, embodied as a mobile telephone.

19. A system comprising:
a local endpoint having a local instance of a Personal Information Management (PIM) application;
a first remote endpoint; and
a second remote endpoint;
wherein the local endpoint comprises:
a memory storing instructions configured to:
subscribe to a feed provided by the first remote endpoint to at least the local endpoint and the second remote endpoint, the feed using a feed synchronization protocol and the PIM application using a separate PIM application synchronization protocol, wherein the second remote endpoint has a second instance of the PIM application that also uses the PIM application protocol;
receive, from the first remote endpoint, a first new item instruction for a first item during a feed synchronization session of the feed, wherein the first new item instruction comprises first item information and a feed ID that is assigned by the first remote endpoint to the first item information to implement the feed synchronization protocol;
responsive to the first new item instruction, cause the local instance of the PIM application to create a local instance of the first item and assign a first application ID to the local instance of the first item, wherein the local instance of the first item is associated with the feed ID and includes the first item information;
synchronize the local instance of the PIM application with the second instance of the PIM application using the PIM application synchronization protocol by receiving, from the second instance of the PIM application, a second new item instruction identifying a second item, wherein the second item is received with both a second application ID assigned by the second instance of the PIM application and the feed ID assigned by the first remote endpoint;

determine that the local instance of the first item and the second item are duplicates based on both the first item and the second item being assigned the feed ID;

make a determination that the second application ID is greater than the first application ID; and responsive to the determination that the second application ID is greater than the first application ID, store the second item on the local endpoint and delete the local instance of the first item from the local endpoint; and a hardware processor configured to execute the instructions.

20. The system of claim 19, wherein the local endpoint, the first remote endpoint, and the second remote endpoint are each embodied as different mobile telephones.

* * * * *